No. 856,935. PATENTED JUNE 11, 1907.
M. B. BASSETT.
COMBINED COOKING UTENSIL HOLDER AND SAD IRON HEATER.
APPLICATION FILED AUG. 7, 1906.

ATTEST.
H. J. Fletcher.
M. P. Smith

INVENTOR.
MARTHA B. BASSETT.
BY Higdon & Longan
ATTY'S

UNITED STATES PATENT OFFICE.

MARTHA B. BASSETT, OF ST. LOUIS, MISSOURI.

COMBINED COOKING-UTENSIL HOLDER AND SAD-IRON HEATER.

No. 856,935.　　　Specification of Letters Patent.　　　Patented June 11, 1907.

Application filed August 7, 1906. Serial No. 329,629.

*To all whom it may concern:*

Be it known that I, MARTHA B. BASSETT, a citizen of the United States, and a resident of St. Louis, Missouri, have invented certain new and useful Improvements in a Combined Cooking-Utensil Holder and Sad-Iron Heater, of which the following is a specification containing a full, clear, and exact description, reference being had to the accompanying drawings, forming a part hereof.

My invention relates to a combined cooking utensil holder and sad iron heater, and the object of my invention is to provide a simple, inexpensive device which is adapted to be positioned on all forms of stoves and ranges for the purpose of holding sad irons while the same are being heated, and, at the same time holding a cooking utensil so that the heat from the stove-hole or burner, after passing around the said irons, is directed onto the cooking utensil supported by the device.

A further object of my invention is to provide a simple device whereby the sad irons are easily placed in and removed from position, and which device can be easily handled and readily transferred from one stove-hole or burner to another.

To the above purposes, my invention consists in certain novel features of construction and arrangement of parts which will be hereinafter more fully set forth, pointed out in the claims, and illustrated in the accompanying drawings, in which:—

Figure 1:
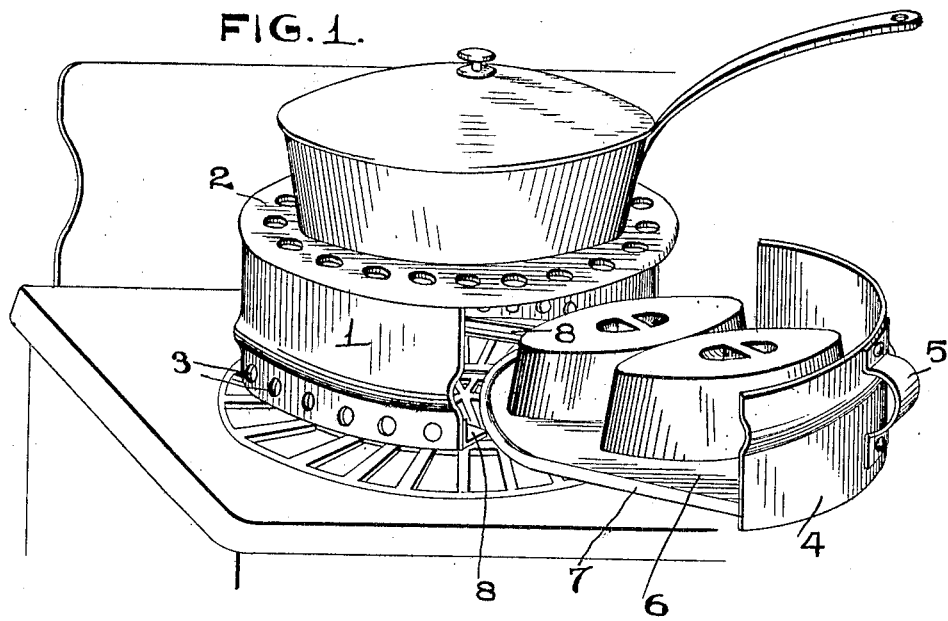
Figure 2:
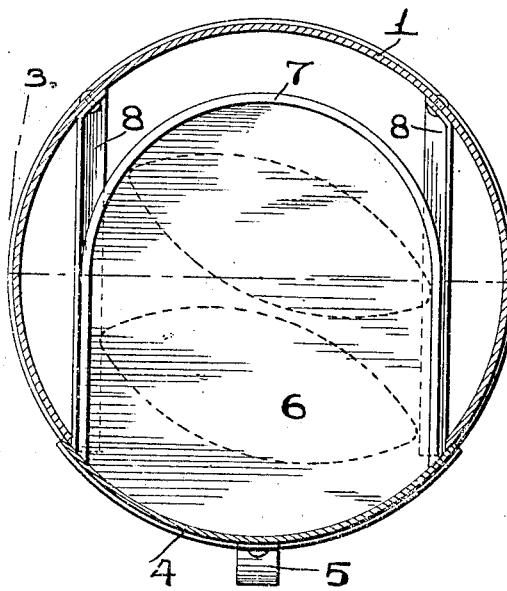
Figure 3:
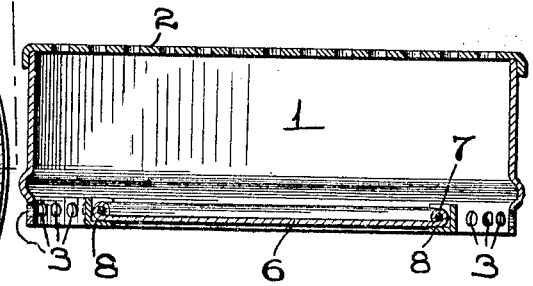

Figure 1 is a perspective view of my improved device in position on a stove top, and showing the sad iron holder of the device withdrawn; Fig. 2 is a horizontal section taken through the center of the device; Fig. 3 is a transverse section taken on the line 3—3 of Fig. 2.

Referring by numerals to the accompanying drawings:—1 designates a cylindrical housing preferably constructed of sheet metal, having an open bottom and a flat perforated top 2. Formed in the wall of the cylindrical housing, around the lower edge thereof, is a series of perforations 3. Formed in one side of the housing 1 is an opening which is normally closed by a curved plate or door 4, provided on its exterior with a loop 5 which performs the function of a handle. Formed on or fixed to the inside face of the plate 4, adjacent the lower edge thereof, is a horizontally disposed plate or shelf 6, which is of such a length as that it extends to the opposite side of the housing 1, and the edge of this plate or shelf is beaded or wired, as designated by 7, in order to stiffen and strengthen said shelf. Located on the interior of the housing, and extending from the front to the rear thereof are rails 8, on which the side edges of the plate 6 slide when inserted in the housing 1.

The device so constructed when in use is positioned immediately over a stove-hole or burner, and the cooking utensil is positioned on the perforated top of the device, as shown in Fig. 1. The sad iron or irons to be heated are positioned on the plate 6 when the same is withdrawn from the housing 1, and when said plate is inserted in the housing and the plate 4 closes the opening in the side of said housing, said plate 6, with the irons, is positioned directly over the flame and heat from the stove-hole or burner. Thus the heat is concentrated within the housing 1, and, after passing around the irons carried by the plate or shelf 6, passes upwardly through the perforated top 2, and heats the cooking utensil and contents thereof. The plate 6 prevents the flame from coming in direct contact with the smoothing surfaces of the said irons, thereby permitting said surfaces to retain their smoothness and temper. The perforations 3 permit air to pass to the exterior of the housing 1, which air rises therein, and thus materially assists in the circulation of said heated air through said housing.

A device of my improved construction is very simple, inexpensive, economizes and concentrates the heat, and provides simple means whereby sad irons may be heated, and, at the same time, directs the heat which would otherwise be wasted, against the bottom of a cooking utensil.

It will be readily understood that my improved device may be utilized as a double cooker by locating a cooking utensil upon the shelf or plate 6.

I claim:—

1. A device of the class described, constructed with an open-bottomed housing having a perforated top and there being a row of perforations through the side wall of the housing adjacent the bottom thereof, there being an opening in one side of said housing, a plate normally closing said opening, and a shelf carried by said plate and extending into the housing the forward end of which plate is rounded, and the entire edge of said plate being beaded; substantially as specified.

2. A device of the class described, constructed with an open-bottomed cylindrical housing having a flat perforated top, there being a single row of perforations formed through the side of the housing adjacent its lower end, there being an opening in one side of the housing which opening extends from the top to the bottom of the housing, a plate normally closing said opening, a shelf fixed integral with the inner face and lower edge of said plate and extending through the opening into the housing, and the entire edge of which plate is beaded.

In testimony whereof, I have signed my name to this specification, in presence of two subscribing witnesses.

MARTHA B. BASSETT.

Witnesses:
M. P. SMITH,
EDWARD E. LONGAN.